J. C. KING.
ELECTRODE.
APPLICATION FILED OCT. 9, 1917.
1,312,261.
Patented Aug. 5, 1919.
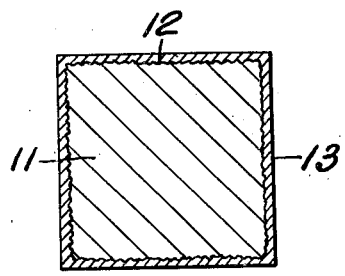
Inventor
Jesse C. King
By Featherstonhaugh & Co
Attys.

UNITED STATES PATENT OFFICE.

JESSE C. KING, OF MONTREAL, QUEBEC, CANADA.

ELECTRODE.

1,312,261.     Specification of Letters Patent.     Patented Aug. 5, 1919.

Application filed October 9, 1917. Serial No. 195,579.

*To all whom it may concern:*

Be it known that I, JESSE C. KING, a citizen of the United States, and resident of the city of Montreal, in the Province of Quebec and Dominion of Canada, have invented certain new and useful Improvements in Electrodes, of which the following is a full, clear, and exact description.

This invention relates to improvements in electrodes for use in electric furnaces and the like.

It is well known that electrodes which usually consist of carbon waste or burn away quite rapidly at points remote from the active end, thus reducing the efficiency and life of the electrode. The carbon body becomes heated to very high temperatures for a considerable distance back from the end, and this heating renders the carbon more or less readily combinable with oxygen of the air or with other gases, with the result that the electrode burns away, thus reducing the sectional area and consequently altering the resistance and conductivity of the electrode.

The main object of my invention is to provide an electrode having on the outer surface thereof a thin coating of non-oxidizing material designed to protect the body of the electrode from combination with gases at all parts of the surfaces not in actual operation. I have found that a coating of finely ground mineral chromite or chrome iron is very suitable for this purpose, and the coating may be applied in the manner described in my copending application, Serial No. 99,104, filed May 22nd, 1916. After the application of the protective coating, the electrode is preferably baked, so that the core and the coating become for all practical purposes integral.

Referring to the drawing, which represents a cross sectional view of the electrode with the coating applied thereto, 11 designates the core or electrode proper of carbon having the surface 12 roughened by any suitable means. The coating of mineral chromite 13 is then applied to the roughened surface, preferably in a plastic condition. The electrode is then baked to drive off the moisture and gases, and to harden both the core and the coating. The mineral chromite which is ground to a suitable fineness may be molded, pasted, pressed or sprayed on to the roughened carbon core, and when suitably hardened, this coating forms an impenetrable coating between the electrode and the gases of the furnace.

It may be found desirable to use a binder consisting of a carbonaceous material such as pitch or the oxids of metals, such as calcium oxid or magnesium oxid, to hold the coating together during the baking process until it becomes thoroughly hardened.

Having thus described my invention, what I claim is:—

1. A coating for electrodes for electric furnaces, consisting of finely ground mineral chromite.

2. A coating for electrodes for electric furnaces consisting of finely ground mineral chromite and a binder for same.

3. An electrode for electric furnaces having a coating of ground mineral chromite bonded or baked on to the core.

4. An electrode for electric furnaces comprising a carbon core having a roughened surface, and a coating of finely ground mineral chromite bonded on to the roughened surface.

5. An electrode for electric furnaces comprising a carbon core having a roughened surface, and a coating of chrome iron mixed with a binding material bonded or baked on to the roughened surface.

In witness whereof, I have hereunto set my hand.

JESSE C. KING.